Oct. 17, 1967        P. LAJOYE        3,346,975
MOTOR-SCRAPER
Filed April 12, 1965
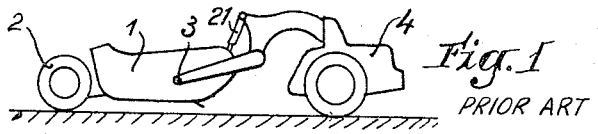
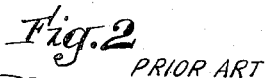
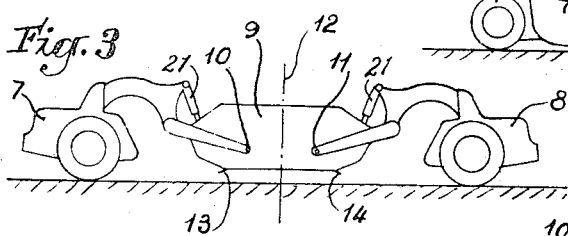
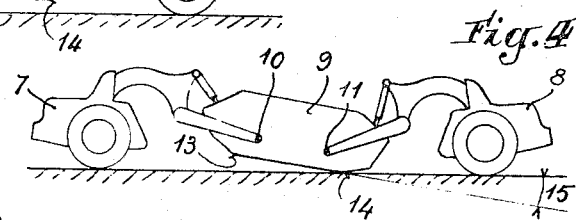
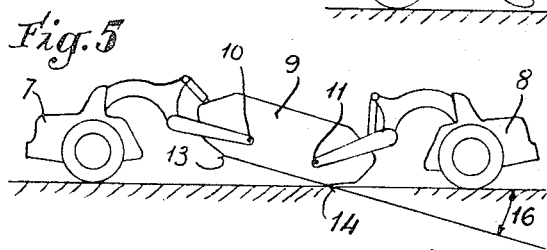
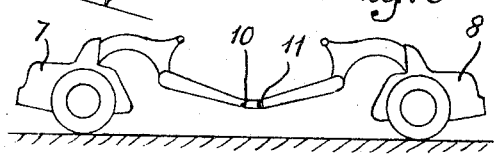
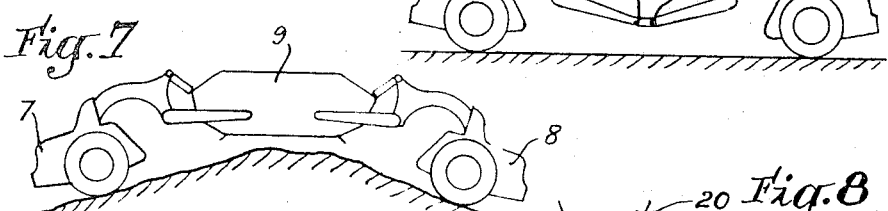
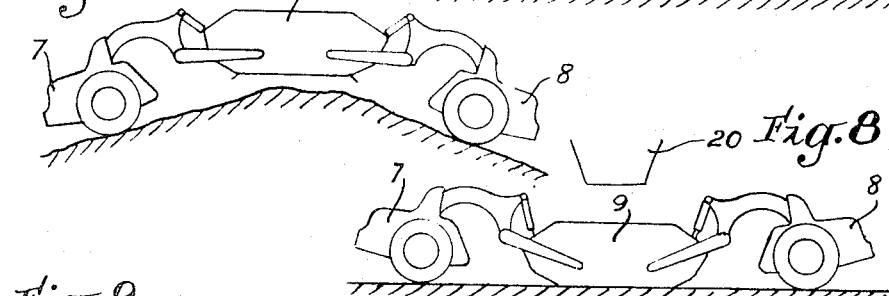
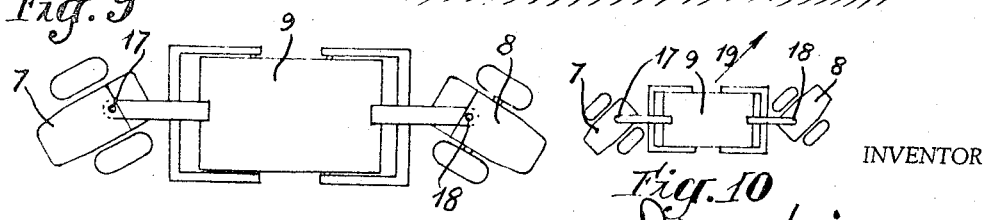
INVENTOR
Pierre Lajoye
BY Alexander H. Howell
ATTORNEY

3,346,975
MOTOR-SCRAPER
Pierre Lajoye, 40 Rue de la Vacquiniere, Montigny-les-Metz, France
Filed Apr. 12, 1965, Ser. No. 447,460
Claims priority, application France, Apr. 13, 1964, 44,683
1 Claim. (Cl. 37—118)

The present invention relates generally to earthwork appliances and more particularly to scrapers, motor-scrapers, or the like.

A motor-scraper of known type comprises a loader and a two-wheel tractor coupled thereto. By means of hydraulic, electric or mechanical servo-systems, it is possible to modify the relative orientation of loader and tractor about a horizontal axis. The loader blade is lowered on the ground and earth is automatically loaded into the loader when the tractor moves forwardly. The whole unit is driven by modifying the relative position of the loader with respect to the tractor about a vertical axis.

This known process results in several drawbacks. Firstly, the appliance must be turned round and come back after each displacement; this operation is generally difficult on workings. Secondly, the orientation of the blade leading edge with respect to the ground is determined definitively by the appliance geometry. Finally, such appliances of known type are generally not powerful enough as having only two driving wheels. In practice, it is often necessary to use an auxiliary tractor to push the loader, or to provide the later with driving wheels driven by an auxiliary engine. One object of the invention is to eliminate such drawbacks and to realize a high power motor-scraper adapted to be displaced indifferently in one direction or in the opposite direction.

Another object of the invention is to realize a motor-scraper permitting to do special maneuvers which are impossible with traditional appliances, and for example to turn round and come back on the spot.

These objects are accomplished in a preferred embodiment of the invention by using a substantially symmetrical loader having no wheels and pivotally carried at each end by a two-wheels tractor, said tractors being oriented back to back. The articulations are provided with servo-mechanisms of any known type. At each articulation, the relative orientation of the loader and of one of the tractors may be varied about both a vertical and a horizontal axis.

In the annexed drawings:

FIG. 1 is a diagrammatical elevation showing a motor-scraper of known type in transport position.

FIG. 2 shows the same appliance in operation.

FIG. 3 illustrates a motor-scraper object of the invention in transport position.

FIG. 4 shows a possible disposition of same.

FIG. 5 illustrates another possible disposition.

FIG. 6 shows two tractors coupled according to the invention in order to form a four-wheel vehicle.

FIG. 7 illustrates a possibility of use of the motor-scraper.

FIG. 8 shows the same appliance passing under an obstacle.

FIGS. 9 and 10 are diagrammatical top plan views of a motor-scraper object of the invention during special maneuvers.

A motor-scraper of known type comprises a loader 1 having rear wheels 2 and hinged at its front end to a horizontal pivot 3 carried by a two-wheels tractor 4. The appliance is operated by varying the relative orientation of loader 1 and tractor 4 about the pivot 3 (FIGS. 1 and 2) by conventional means 21.

When the tractor 4 is parallel to the ground (FIG. 1), the motor-scraper may be moved as an independent vehicle.

If pivot 3 is lowered, the transverse blade 5 provided at the loader front portion is put down on the ground (FIG. 2). When the tractor moves forwardly, said blade 5 scrapes with a predetermined angle 6 and earth is loaded into the loader 1.

As above-indicated, such a system has important drawbacks since the appliance 1-2-3-4 is not symmetrical and must be driven forwardly.

Moreover, the blade leading edge angle 6 is definitively determined and it is impossible to adapt same to the different classes of grounds.

A motor-scraper according to the invention comprises two two-wheel tractors 7 and 8 (FIGS. 3 to 10) preferably identical and orientated back to back. A loader 9 having no wheels hinges at one end on a horizontal pivot 10 carried by tractor 7 and at the other end on a horizontal pivot 11 provided on tractor 8. Each horizontal pivot 10 or 11 is mounted at the rear end of the corresponding tractor 7 or 8. According to another characteristic of the invention, loader 9 is substantially symmetrical with respect to the transverse middle plane 12. More particularly, loader 9 has two scraping blades 13 and 14 located on both sides of symmetry plane 12.

When the chassis of both tractors 7 and 8 are substantially parallel to the ground (FIG. 3), the motor-scraper object of the invention may be driven in the same manner as a traditional four-wheel vehicle. It may be driven indifferently in both directions, since it is substantially symmetrical with respect to the plane 12.

As a result thereof, tractor 7 may be indifferently located at the vehicle front or rear end with respect to the movement direction.

In operation, the motor-scraper object of invention has different possibilities of use.

As shown in FIG. 4, the tractor 8 has to be inclined until blade 14 rests on the ground while tractor 7 is kept parallel to the ground. Under these conditions, the motor-scraper works with an operative angle 15.

On the contrary, FIG. 5 illustrates another possibility wherein the outer end of tractor 7 has been lowered, which results in an elevation of pivot 10. At the same time, the orientation of tractor 8 permits blade 14 to rest on the ground. In this case, the distance of pivot 10 above the ground is more than in FIG. 4, and the resulting operative angle 16 is different from angle 15.

It will be understood that the relative orientation of both tractors 7 and 8 may be modified as desired in order to adjust the motor-scraper operative angle at any intermediate value perfectly adapted to the nature of the ground and to the work conditions.

If it is desired to displace tractors 7 and 8 without the loader 9, it is only necessary to couple directly said tractors 7 and 8 back to back as illustrated in FIG. 6.

FIG. 7 shows how a motor-scraper according to the invention permits to elevate the loader 9 above the ground, and to facilitate the appliance displacement above a ground unevenness. This original result is obtained by lowering simultaneously the outer ends of both tractors 7 and 8.

FIG. 7 illustrates the opposite maneuver in order to displace loader 9 under an obstacle 20.

FIGS. 9 and 10 illustrate the pivots 17 and 18 coupling the tractors to the loader. It will be understood that a motor-scraper according to the invention permits to effect special maneuvers such as turning with a very short radius. For this purpose, tractors 7 and 8 are both orientated on the same side of the vertical longitudinal middle plane of the loader 9 by rotation about pivots 17 and 18 (FIG. 9).

If tractors 7 and 8 are kept parallel, but turned about pivots 17 and 18 with respect to the loader 9 (FIG. 10), the motor-scraper has a Z-shaped top plan profile permitting to translate the loader 9 in the direction of arrow 19, that is obliquely with respect to the longitudinal vertical middle plane of said loader 9.

If tractors 7 and 8 are turned about pivots 17 and 18 more than indicated in FIG. 10 until they are orientated perpendicularly to the longitudinal axis of loader 9, the later may be turned on the spot about its vertical middle axis by driving tractors 7 and 8 in opposite directions.

A motor-scraper according to the invention may be driven by two operators, one of them driving tractor 7 and the other one tractor 8. A radio or phone connection is provided between both tractors.

It is possible to drive such a motor-scraper by only one driver operating electrical, mechanical, or pneumatic systems connecting tractors 7 and 8.

I claim:

In a motor-scraper the combination of a loader having a bowl and provided at each end with an earth scraping blade, said loader being similarly pivotally suspended between two independent engine-driven tractors oriented back to back, each tractor being mounted on a single two-wheel axle and each tractor having an articulated connection for suspending said bowl, said connection comprising means providing longitudinally spaced vertical and horizontal pivot connections with an end of said bowl and a respective tractor, and means on said tractors for optionally pivoting the opposite ends of said bowl in a vertical direction with reference to the tractors.

References Cited

UNITED STATES PATENTS

| | | | |
|---|---|---|---|
| 2,061,924 | 11/1936 | Slate | 37—129X |
| 2,340,169 | 1/1944 | Arndt | 37—156 |
| 2,494,324 | 1/1950 | Wright | 37—156 |
| 2,883,774 | 4/1959 | Clifford | 37—127 |
| 3,073,045 | 1/1963 | Kelley | 37—129 |

ABRAHAM G. STONE, *Primary Examiner.*

A. E. KOPECKI, *Assistant Examiner.*